Sept. 12, 1939.  E. L. KLOCK  2,172,795
SUGARCANE HARVESTER
Filed July 25, 1938  4 Sheets-Sheet 1
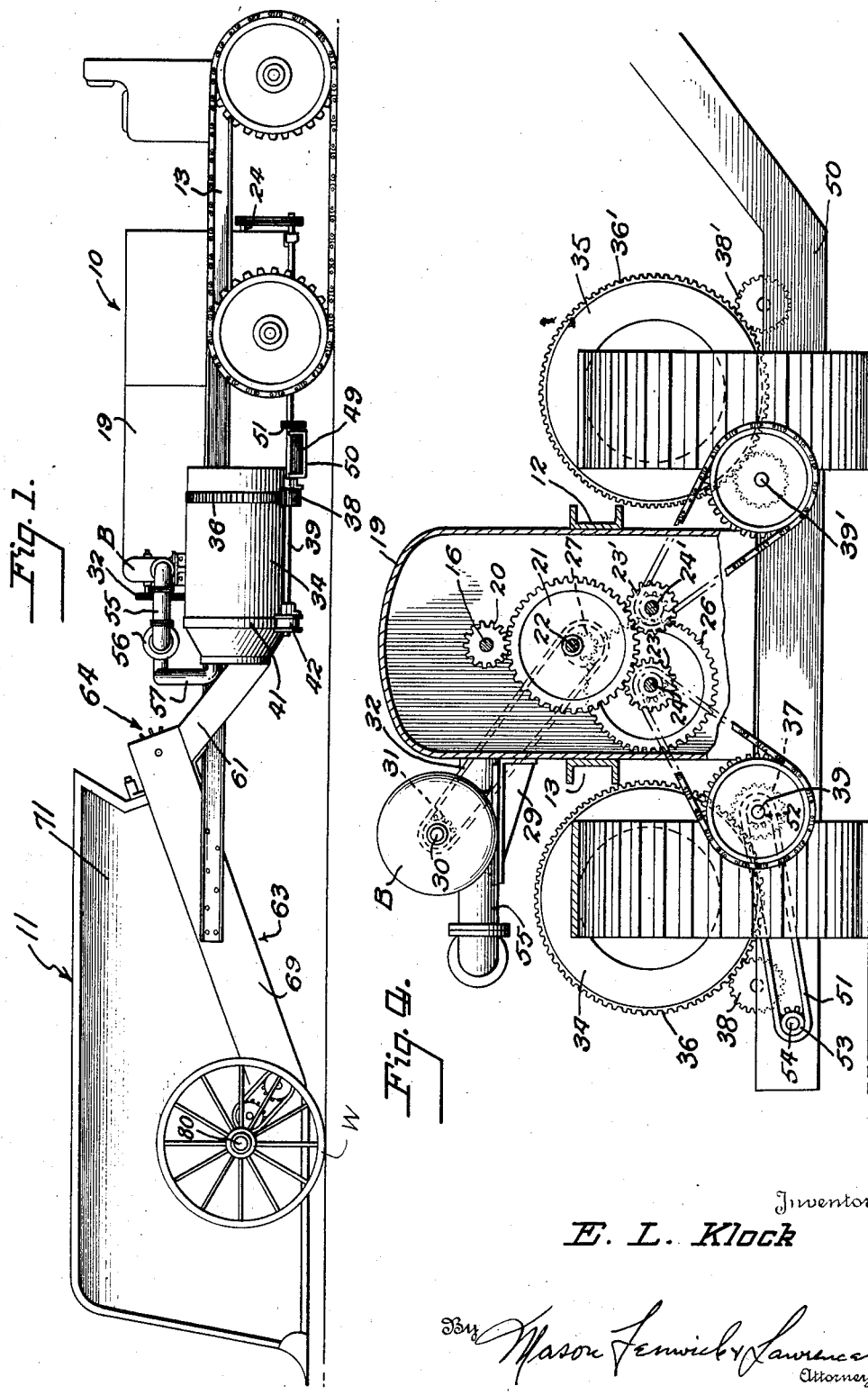
Inventor
E. L. Klock
By Mason Fenwick & Lawrence
Attorneys

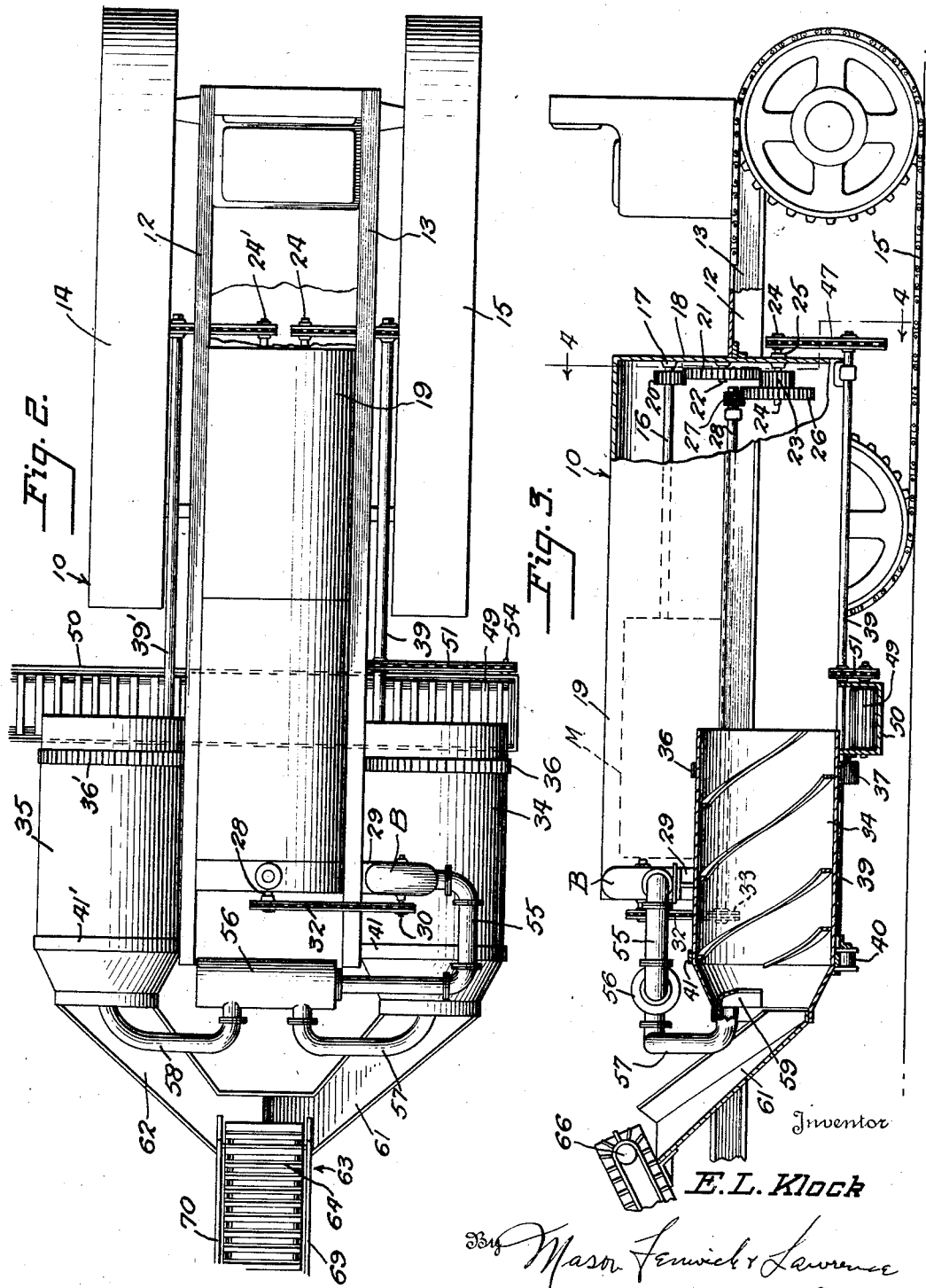
Sept. 12, 1939.  E. L. KLOCK  2,172,795
SUGARCANE HARVESTER
Filed July 25, 1938  4 Sheets-Sheet 2
Inventor
E. L. Klock
By Mason, Fenwick & Lawrence
Attorneys

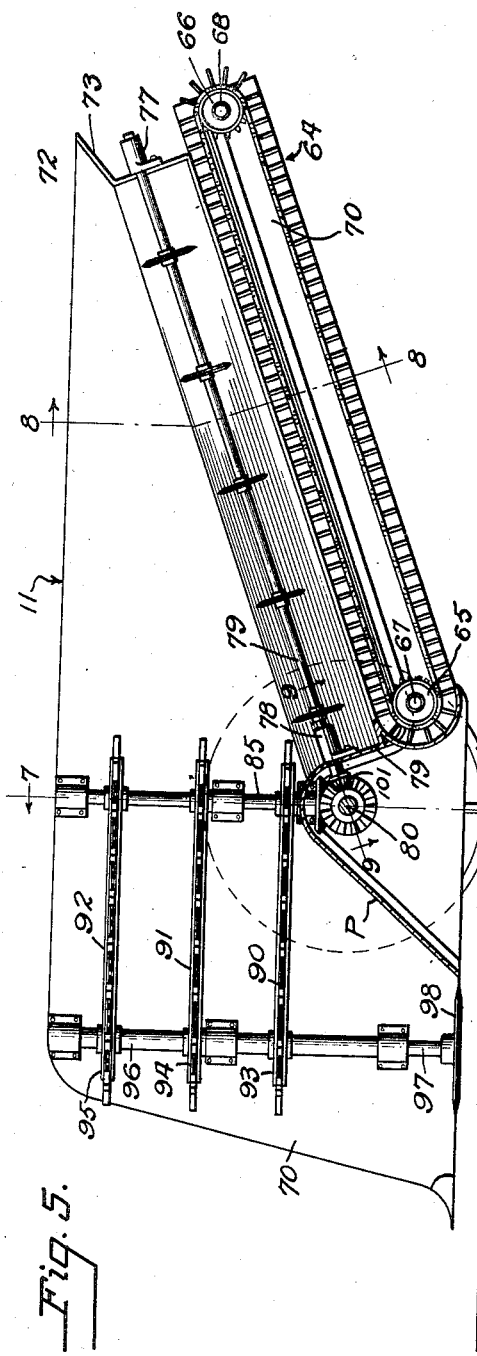

Sept. 12, 1939.  E. L. KLOCK  2,172,795
SUGARCANE HARVESTER
Filed July 25, 1938  4 Sheets-Sheet 4
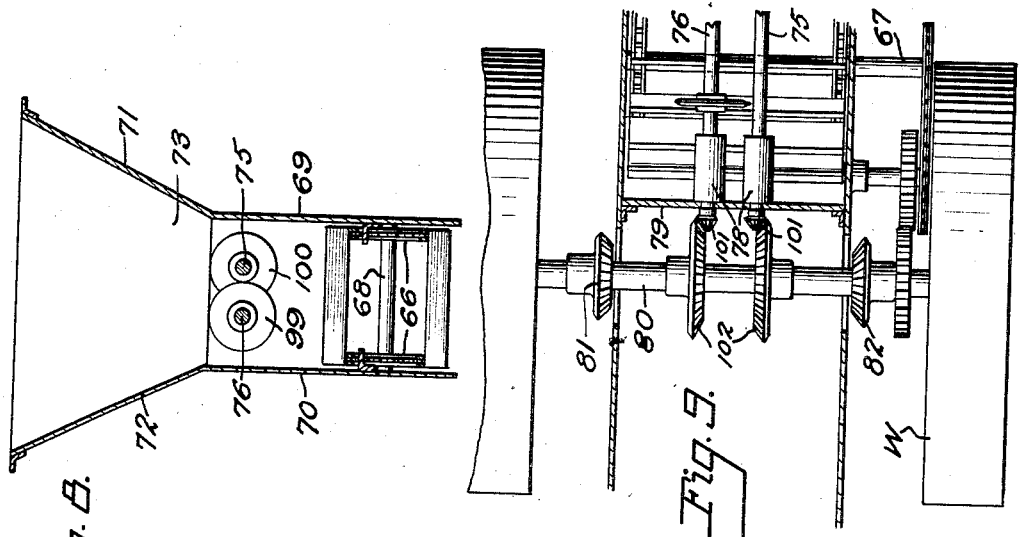
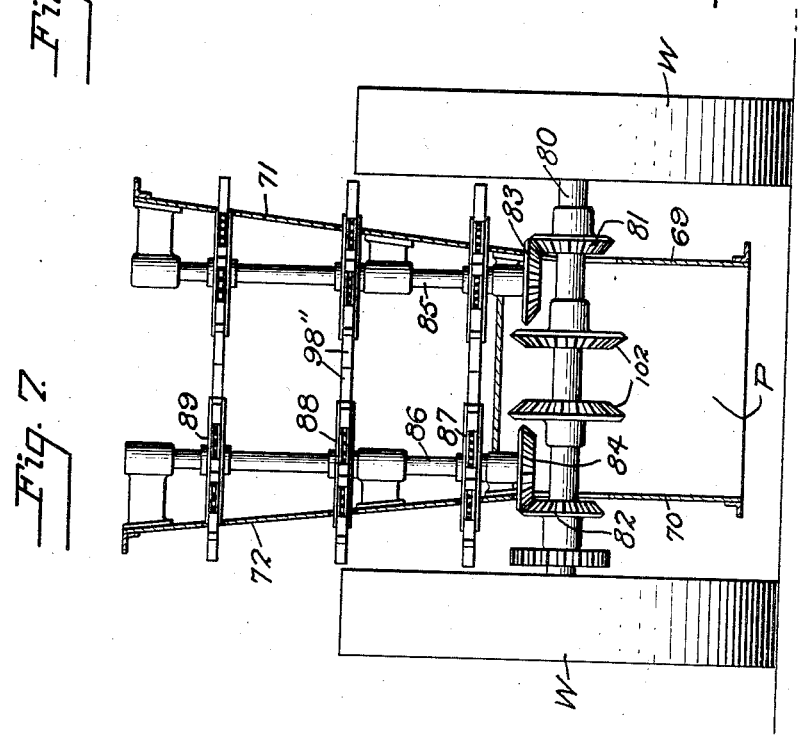
Inventor
E. L. Klock
By Mason Fenwick & Lawrence
Attorneys Patented Sept. 12, 1939

2,172,795

UNITED STATES PATENT OFFICE 2,172,795

SUGARCANE HARVESTER

Ernest L. Klock, La Romana, Dominican Republic, West Indies

Application July 25, 1938, Serial No. 221,190

7 Claims. (Cl. 56—17)

This invention relates to harvesting machinery in general; and more particularly to harvesting machinery designed for cutting, cleaning and loading sugar cane.

The main object of the invention is to provide a sugar cane harvester in which the operations of cutting and cleaning the cane and of loading the same are carried out continuously and automatically.

Other objects of the invention will become apparent as the detailed description thereof proceeds:

In the drawings:

Figure 1 is a side elevation of the complete harvester;

Figure 2 is a fragmentary top plan view of the cleaning and loading unit of the harvester;

Figure 3 is a side elevation of the unit shown in Figure 2, with parts thereof broken away and shown in section, to illustrate details of construction;

Figure 4 is a vertical transverse section taken on the line 4—4 of Figure 3;

Figure 5 is a central vertical section of the cane cutting unit of the harvester, the section being taken on the line 5—5 of Figure 6;

Figure 6 is a top plan view of the unit shown in Figure 5;

Figure 7 is a vertical, transverse section taken on the line 7—7 of Figures 5 and 6;

Figure 8 is a section taken on the line 8—8 of Figure 5; and

Figure 9 is a section taken on the line 9—9 of Figure 5.

As shown in the drawings, the harvester comprises a cleaning and loading tractor unit, designated generally by the reference numeral 10, and a cutting and loading unit designated generally by the reference numeral 11. The tractor unit comprises a chassis having parallel runners 12 and 13 suitably connected by cross braces (not shown) to form the supporting framework of the tractor apparatus. The framework is supported on the caterpillar units 14 and 15, suitably connected to a motor M of the internal combustion type such as is commonly used for driving tractors of this type. The various elements connecting the motor M to the caterpillar tractor units are omitted to avoid confusion with the invention forming the subject matter of this case. The invention starts with the driving shaft 16 which is assumed to be connected to and driven by the motor M, indicated diagrammatically in the drawings.

The shaft 16 is shown particularly in Figure 3 as having one end thereof mounted in a bearing 17 secured to the end wall 18 of a casing 19 which encloses the engine and the other operative elements of the tractor unit. The shaft 16 has a pinion 20 secured thereto and meshing with a gear 21 rotatably mounted on a stub shaft 22 secured to and projecting from the end wall 18 of the casing. A pinion 23 is secured to a shaft 24 mounted to rotate in a bearing 25 projecting through the end wall 18 in opposite directions. The shaft 24 has a gear 26 fixed thereto and in mesh with a pinion 27 suitably secured to the end of a shaft 28 which extends throughout the length of the casing 19 and is suitably mounted in bearings (not shown) to operate a blower designated generally by the reference character B.

The blower B is mounted on a bracket 29 fixed to one side of the casing 19 near the forward end thereof. The shaft 30 of the blower B has a sprocket 31 suitably secured thereto and connected by a sprocket chain 32 to a sprocket 33 on the end of the shaft 28 where it projects through the forward end wall of the casing 19. It will be apparent from Figures 3 and 4 of the drawings that the gearing interposed between the power-driven shaft 16 and the blower shaft 30 constitutes a reduction gear set for driving the blower at suitable speed.

Cleaning drums 34 and 35 are mounted to rotate on opposite sides of the tractor unit framework. The drum 34, adjacent its rear end, has fixed thereto the gear ring 36 in mesh with supporting pinions 37 and 38, the pinion 37 being secured to a shaft 39 mounted to rotate in bearings suitably secured to the framework. The shaft 39 is continued along the drum 34 and is provided at its outer end with a grooved roller (not shown) in contact with a band 41 secured to the periphery of the drum 34. A second grooved roller 42 is suitably supported on the framework of the tractor unit to engage and support the opposite side of band 41. The pinion 38 acts as an idler support mounted to rotate on the framework of the tractor unit in engagement with the gear ring 36.

The drum 35 at the other side of the tractor unit is similarly supported for rotation in the same direction as the drum 34. The parts of the mechanism for rotating and supporting the drum 35, which correspond to the similar mechanism for rotating drum 34, are indicated by the same reference numerals primed. Rotation of the shaft 39' is effected by a chain and sprocket connection to the shaft 24' which is mounted on the end wall 18, as shown in Figure 4 of the drawings, symmetrically with respect to a plane passing through the axes of the shafts 16 and 28. The symmetrical gear arrangement for driving the drums 34 and 35 in the same direction will be apparent from inspection of Figure 4 of the drawings.

The open rear ends of the drums 34 and 35 are located to discharge their cleaned contents onto an endless conveyor 49 mounted in a channel casing 50 extending transversely of the tractor frame. The conveyor 49 is operated by a sprocket chain 51, connecting the sprocket 52 with sprocket 53 secured to a shaft 54 extending transversely across the vertical walls of the channel member 50.

The blower B is connected by piping 55 to a receiver 56, from which air under pressure is conducted through the pipes 57 and 58 to semicircular nozzles 59 and 60 fixed to the framework at the intake end of the drums 34 and 35, respectively. These nozzles are mounted directly over the ends of the chutes 61 and 62, respectively where they enter the drums for the purpose of cleaning the cane of all trash and tops. The chutes extend symmetrically upward and toward each other from the drums 34 and 35, and are connected at their upper ends to the casing 63 enclosing the conveyor mechanism 64 forming part of the cutting and loading unit 11.

No attempt has been made to illustrate in the drawings all the elements of the framework necessary to support the drums and the operating shafts of the two units which combine to make the harvester. The drawings are in effect diagrammatic layouts of the essential elements, it being understood that persons skilled in the art will supply the necessary supporting structures for these various parts.

The conveyor 64 is of the endless type supported by sprockets 65 and 66 spaced apart and suitably secured to the shafts 67 and 68, respectively, journalled for rotation in the substantially vertical side walls 69 and 70 of the casing 63. As shown in Figures 2, 5 and 6, the conveyor 64 is of open surface, cross-bar type, which permits considerable of the leafy trash to fall to the ground. The side walls 69 and 70 are connected along their upper edges to the outwardly inclined walls 71 and 72 forming parts of a hopper for receiving sugar cane fed thereto by mechanism hereinafter described. The rear ends of the outwardly inclined walls 71 and 72 are connected by an end wall 73 which is bent downwardly toward and terminates a short distance above the upper branch of the conveyor 64.

Directly above the upper branch of the conveyor 64, a pair of shafts 75 and 76 are journalled at their opposite ends in bearings 77, secured to the end wall 73, and in bearings 78 secured to a wall 79 forming part of a partition P which divides the conveying mechanism from that which actually performs the cutting operation on the stalks of sugar cane as they stand in the field. The partition P is shaped substantially as an inverted V and encloses a shaft 80 extending through the opposite side walls of the casing 63 to receive the wheels W forming the support for the cutting unit of this harvester.

The shaft 80 (see Figure 7) has the bevelled gears 81 and 82 suitably secured thereto to mesh with bevelled gears 83 and 84, which are secured to the lower ends of the substantially vertical shafts 85 and 86 mounted to rotate in bearing brackets suitably secured to the upper part of the side walls 69 and 70. Sprockets 87, 88 and 89 are suitably secured to the shaft 86 and are connected by chains 90, 91 and 92 to sprockets 93, 94 and 95 suitably secured to a substantially vertical tubular shaft 96 mounted to rotate in bearings secured to the side wall 70 of the casing 63. The tubular shaft 96 extends downwardly in the casing 63 below the top of the partition P; and a shaft 97, keyed for slidable adjustment in a tubular shaft 96, is provided at its lower end with a cutter disk 98 designed to cut the stalks of sugar cane as they stand in the field. The chain and sprocket mechanism just described is duplicated on the shaft 85 and on a parallel shaft 96' similarly mounted on the side wall 69 of the casing 63.

The lower end of the side walls 69 and 70 are curved inwardly toward each other and are provided with plough points forming the entering points of a throat which gathers the sugar cane stalks and directs them toward the cutting disks 98 and 98'. The pairs of sprocket chains 90 and 90'; 91 and 91'; and 92 and 92' are provided with laterally projecting lugs 98 which engage the cut stalks of sugar cane and feed them directly rearwardly of the cutting unit and over the top of the partition P into the hopper formed by the inclined walls 71 and 72 and onto the saws 99 and 100 which are suitably secured to, and spaced apart along, the shafts 75 and 76. The shafts 75 and 76 are provided at their lower ends with bevel gears 101 in mesh with bevel gears 102 spaced apart along and suitably secured to the shaft 80. It will be obvious that as the shaft 80 rotates, the bevel gears 102 in mesh with the gears 101 will rotate to the shafts 75 and 76 and the saws 99 and 100. The sugar cane stalks cut into short lengths by the saws 99 and 100 fall upon the upper branch of the endless conveyor 64 and are conducted thereby to the troughs 61 and 62 leading to the cleaning drums 34 and 35 of the tractor unit.

In the operation of the harvester, the apparatus is steered until the wheels W straddle the row of sugar cane to be cut and is then driven ahead. The gathering chains draw the cane into the throat formed by the side walls 69 and 70 and against the cutter disks 98 and 98'. The lower ends of the cut cane stalks contact with the inclined surface of the partition P and are retarded thereby. The upper ends of the stalks are fed by the gathering chains so that the stalks fall lengthwise into the hopper to be received and cut by the saws 99 and 100. The short lengths of stalk and much of the trash falls onto the open endless conveyor. The greater part of the trash passes through the slots of the endless conveyor while the stalks are carried by the upper branch of the conveyor to be discharged into the troughs of the tractor unit, whence they are fed into the cleaner drums to be discharged finally through the transverse conveyor into carts or wagons intended to transport the cleaned short lengths of sugar cane stalks for processing.

It is to be understood that the invention is not to be considered as limited to the particular details of construction shown in the drawings, nor in any other manner except as indicated by the scope of the claims appended hereto.

What I claim is:

1. In a cane harvesting machine having a frame, shafts rotatable on said frame about parallel axes lengthwise of the frame and having saws spaced apart thereon and fixed thereto, means for cutting a row of standing cane at the lower ends thereof and for feeding the cut stalks onto said saws, a conveyor below said saws to receive the lengths into which the stalks have been cut by said saws, and cleaning mechanism arranged to receive said lengths of sugar cane from said conveyor.

2. In a cane harvesting machine having a frame, shafts rotatable on said frame about parallel axes lengthwise of the frame and inclined upwardly from the horizontal and having saws spaced apart thereon and fixed thereto, means for cutting a row of standing cane at the lower ends thereof and for feeding the cut stalks lengthwise onto said saws, an open surface conveyor below said saws to receive the lengths into which the stalks have been cut by said saws, and cleaning mechanism at one end of said conveyor to receive the lengths of sugar cane therefrom.

3. A cane harvester comprising a movable vehicle body having means for propelling the same, a frame having substantially vertical walls at the forward end of said body and forming a throat to receive a row of standing cane, means in said throat for cutting the standing cane at the lower ends thereof, means transverse to the frame and spaced longitudinally of the frame for cutting the stalks of cane into lengths, means for moving the upper portions of cut stalks more rapidly than lower portions of the stalks from said throat onto said cutting means, and an open surface conveyor below said second named cutting means for moving the cut lengths of cane therefrom.

4. A cane harvester comprising a movable vehicle body having means for propelling the same, a frame having spaced apart substantially vertical walls and forming a throat to receive a row of standing cane, means comprising idler disk knives in said throat for cutting the standing cane at the lower ends thereof, a plurality of shafts spaced apart parallel to each other and extending longitudinally of the frame and having saws arranged thereon in staggered relation, means for feeding the cut stalks from said throat onto said saws, and a conveyor arranged below said parallel shafts.

5. A cane harvester comprising a movable vehicle body having means for propelling the same, a frame having spaced apart substantially vertical walls forming a throat to receive a row of standing cane, means comprising idler cutter disks overlapping each other in said throat for cutting the standing cane at the lower ends thereof, a plurality of shafts spaced apart parallel to each other and upwardly inclined longitudinally of the frame, saws secured to said shafts in staggered relation to each other, means for feeding the cut stalks from said throat onto said saws, and a conveyor arranged below said parallel shafts.

6. In cane harvesting apparatus having a frame, a throat to receive cane to be cut and idler cutter disks overlapping each other and mounted at the bottom of the throat, propelling fingers mounted in an upper portion of the throat to move cane in the upper portion of the throat more rapidly than the cane at the bottom, a rotatable shaft extending in the path of cut stalks and mounted longitudinally of the frame and upwardly inclined, disk cutters spaced along the shaft to cut the stalks into lengths in the direction of travel, a conveyor of open face type under the cutter shaft adapted to separate leafy trash and to convey the cut lengths of stalks, a rotatable drum to receive the cut lengths of cane partially freed from trash, and means to eliminate further trash from the stalks in the rotatable drum.

7. A cane harvesting apparatus having a frame, a throat to receive cane to be cut and idler cutter disks overlapping each other and mounted in the bottom of the throat, propelling fingers mounted in an upper portion of the throat to move cane in the upper portion of the throat more rapidly than the cane at the bottom, a rotatable shaft extending in the path of cut stalks and mounted longitudinally of the frame, disk cutters spaced along the shaft to cut the stalks into lengths in the direction of travel, a conveyor of open faced type adapted to separate leafy trash and to convey the cut lengths of stalks, mounted under and lengthwise of the cutter shaft and rising toward the rear of the cutters, and a rotatable drum at the upper end of the conveyor to receive the cut lengths of cane partially free from trash, and means to eliminate further trash from the stalks in the rotatable drum.

ERNEST L. KLOCK.